C. D. WRIGHT.
AUTOMOBILE POWER TRANSMITTING APPARATUS.
APPLICATION FILED JUNE 1, 1914.
1,143,157. Patented June 15, 1915.
2 SHEETS—SHEET 1.
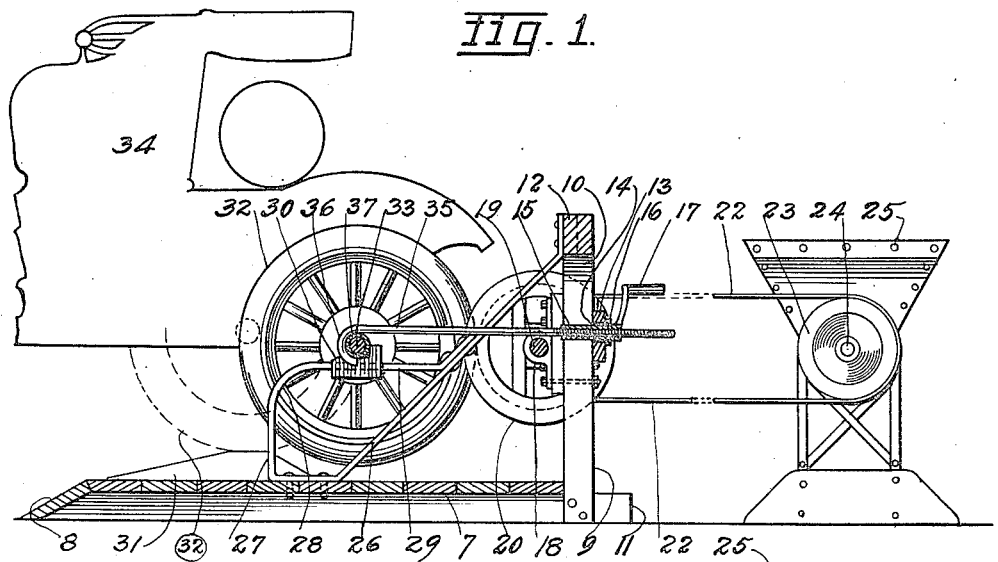
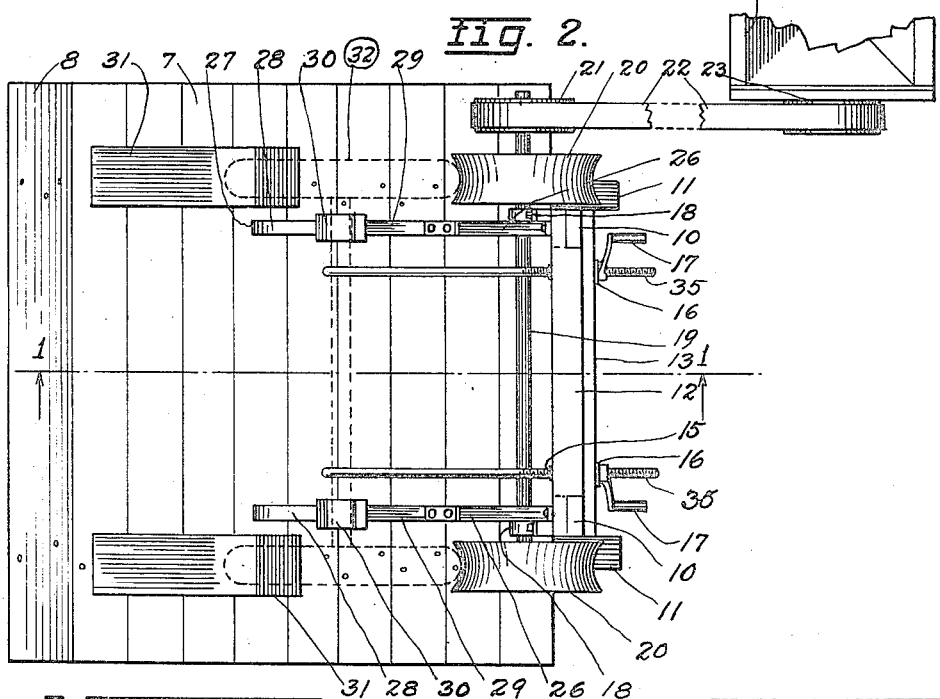

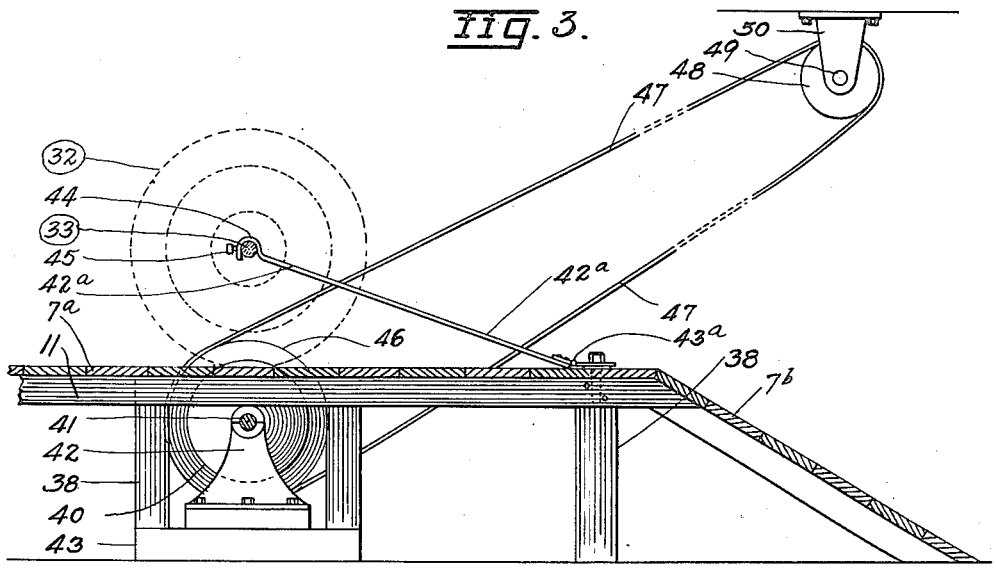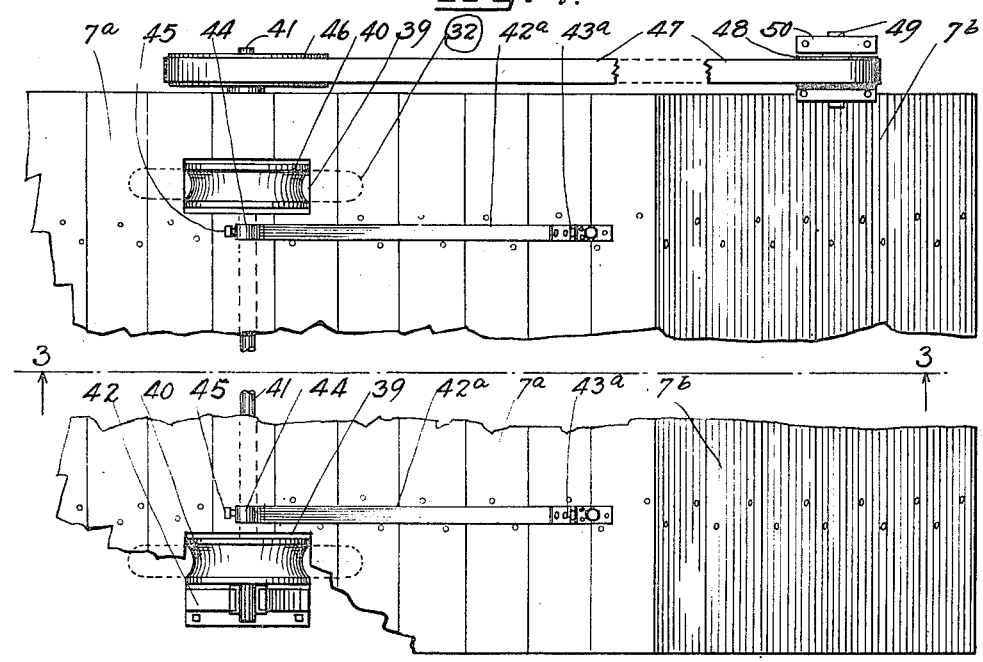

UNITED STATES PATENT OFFICE.

CHARLES D. WRIGHT, OF ADRIAN, MICHIGAN, ASSIGNOR OF ONE-HALF TO ROBERT D. BRADEN, OF CHICAGO, ILLINOIS.

AUTOMOBILE POWER-TRANSMITTING APPARATUS.

1,143,157. Specification of Letters Patent. Patented June 15, 1915.

Application filed June 1, 1914. Serial No. 842,037.

*To all whom it may concern:*

Be it known that I, CHARLES D. WRIGHT, a citizen of the United States, and a resident of the city of Adrian, in the county of Lenawee and State of Michigan, have invented certain new and useful Improvements in Automobile Power-Transmitting Apparatus, of which the following is a specification.

This invention relates to improvements in a power transmitting apparatus, and while it is more particularly intended for use in connection with an automobile for transmitting power from the rear or driven wheels thereof to a machine or part to be driven by such transmitted power, yet it is applicable for use in connection with a motor-cycle for the same purpose, and it consists in certain peculiarities of the construction, novel arrangement and operation of the various parts thereof, as will be hereinafter more fully set forth and specifically claimed.

The principal object of the invention is to provide a power transmitting apparatus for use in connection with motor-vehicles, which shall be simple and inexpensive in construction, strong, durable and efficient in operation, and so made as to be readily portable and placed in such position that an automobile or motor-vehicle can be easily mounted thereon and held in engagement with certain parts of the apparatus, to the end, that power from the driven wheels of the automobile or motor-vehicle can be transmitted to machines, such as feed-grinders, or cutters, sawing-machines, cider-mills, corn-shellers, fans and the like, for the purpose of operating them.

Another object is to so construct the apparatus that the automobile or motor-vehicle can be mounted thereon for operation, automatically, or, in other words, without being lifted or "jacked up" into operative position, and when so mounted, can be securely held or readily released and dismounted.

Other objects and advantages of the invention will be disclosed in the subjoined description and explanation.

In the accompanying drawings, which serve to illustrate an embodiment of the invention, Figure 1 is a view partly in section and partly in elevation taken on line 1—1 of Fig. 2, looking in the direction indicated by the arrows, showing the rear portion of the body of an automobile mounted on the apparatus in position for transmitting power from the rear wheels thereof to a machine operated by said transmitted power; Fig. 2 is a plan view of like parts; Fig. 3 is a vertical sectional view showing a modification in the construction of the apparatus, illustrating it geared by means of a belt to a pulley on a shaft employed for driving any suitable kind of machinery, and Fig. 4 is a plan view of like parts shortened for the convenience of illustration.

Like numerals of reference refer to like parts throughout the different views of the drawings.

Referring now to Figs. 1 and 2 of the drawings, it will be seen and understood that the apparatus consists of a frame which has a horizontal base or platform 7, of any desired size, form, material and construction, but preferably at one of its ends with a downwardly inclined portion 8 to rest on the ground. At its other end the base or platform 7 is provided with an upright frame, which is designated as a whole by the reference numeral 9, and by preference consists of two uprights or standards 10 secured at their lower portions to beams or bars 11, which horizontally support the platform 7, as is clearly shown in Fig. 1 of the drawings. The uprights 10 are united at their upper portions by means of a cross bar 12, and below said bar by means of a horizontal bar 13, which is provided near each of its ends with a transverse opening 14, in each of which openings is located for rotation an internally screw threaded sleeve 15, which has on its outer portion an annular flange 16, to rest against the outer surface of the bar 13, and each of said sleeves is also provided at its outer portion with a crank handle 17, used for turning the same. The opening 14 for each of the sleeves 15 is somewhat larger than said sleeve so as to permit of its inner end being slightly raised or lowered, for the purpose to be presently explained.

Mounted on the front surface of the upright portion 9, of the supporting frame, and by preference on the front surface of each of the uprights 10 thereof at a suitable distance above the base 7 is a journal-box 18 of the ordinary or any preferred construction, in which boxes is horizontally journaled a shaft 19, which has near each of its ends a pulley or wheel 20 mounted to rotate with said shaft and by preference slightly concaved circumferentially, as shown in Fig. 2 of the drawings. Mounted on the shaft 19, near one of its ends is a pulley 21, to which a belt 22 may be applied for transmitting power to a pulley 23 on a shaft 24 of a feed grinder or cutter 25 or an analogous machine to be operated. Extended from the upper part of the upright portion 9 of the supporting frame, which consists of said upright portion and the base 7, are a pair of brace bars 26, which by preference are secured at their upper ends to the front portion of the cross bar 12 near its ends, and are extended downwardly and forwardly and secured at their lower ends to the upper surface of the base 7 at about the middle thereof. Extended upwardly from the base 7, at the lower front portion of each of the brace bars 26, is a bracket 27, each of which is provided with an elbow 28, and has extended from the upper portion of said elbow an extension 29, which is secured to the brace bar 26 at about the middle thereof, as is clearly shown in Figs. 1 and 2 of the drawings. Slidably mounted on each of the horizontal extensions 29 of each of the brackets 27 is a block 30, which may have its upper surface cushioned to prevent marring the rear axle of the automobile or motor-vehicle, or said blocks may be made of wood, which material will attain the same result. Directly in front of each of the pulleys 20, and mainly in front of each of the brackets 27, but outwardly thereof, and secured to the base 7, is a block 31, each of which has its front surface downwardly and forwardly inclined, and its rear portion rearwardly and downwardly inclined, as is clearly shown in Fig. 1 of the drawings, in which figure it will be noted that the thickest or highest point of each of the blocks 31 is located near the upright portion of each of the brackets 27. The blocks 31 are employed to elevate the wheels 32 and rear axle 33 of the automobile 34 or motor-vehicle, so that said axle may be placed in position on the blocks 30 carried by the extensions 29 of the brackets 27, without being lifted or jacked up. Extended into each of the internally screw threaded sleeves 15 is a screw threaded rod 35, each of which has at its front end a hook 36 to engage a sleeve 37, which usually surrounds the rear axle 33 of the automobile, but in the event such sleeve is not used, it is obvious that the hooks 36 will engage the axle, when it is apparent that by turning the sleeves 15, by means of the crank handles 17, the rods 35 will be moved in the proper direction to draw the axle 33 of the automobile and the wheels 32 thereon rearwardly so that the latter will be free from the elevating blocks 31 and in contact with the pulleys 20, to which power will be applied through the movement of the vehicle wheels and transmitted by suitable gearing, such as the belt 22 to the machine or part to be operated.

In using the foregoing described construction, it is manifest that the automobile must be propelled backwardly in order that the brackets 27 may support the wheels at a distance from the base and in contact with the pulleys 20, and it will be understood that as the blocks 30 are slidably mounted on the extensions 29 of the brackets 27 that said blocks should be slid forwardly on the extensions 29 until they reach the elbows 28, in which position they will be ready to receive on their upper surfaces the axle of the vehicle, which axle can then be engaged by the hooks 36 of the rods 35 and drawn rearwardly so that the wheels 32 will contact with the pulleys 20 by turning the crank handles 19 on the sleeves 15 in the proper direction.

In Figs. 3 and 4 of the drawings, is shown a modification in the construction of the apparatus, which consists in employing a base or platform 7ª of a similar construction to that shown in Figs. 1 and 2 and above described, except that this platform is supported by means of legs 38 at a suitable distance from the ground, and has near each of its sides an opening 39, through which the upper portion of pulleys 40, mounted on a shaft 41, project slightly. The shaft 41 is journaled on pillow blocks 42, carried by a floor 43, horizontally supported at the lower portion of the legs 38 of the platform. In this modified construction one end of the platform is provided with an inclined portion 7ᵇ, on which the automobile or vehicle can be driven upwardly until the rear wheels 32 thereof shall ride on or contact with the grooved surfaces of the pulleys 40, as is shown by dotted lines in Fig. 3 of the drawings. The automobile and its rear wheels 32 may be held in this position by means of rods or bars 42ª, each of which is secured by means of hinges 43ª at one of its ends to the upper surface of the platform, and has at its other end a hook 44 to engage the axle 33 of the motor vehicle. Each of the hooks 44 of the bars 42ª may be provided with set screws 45 for fastening the hooks in position on the axle 33 so as to more securely hold the axle in its proper position. The shaft 41 is provided near one of its ends with a pulley 46 over which is extended a belt 47 which also extends over a pulley 48 mounted on a shaft 49 journaled in suitable hangers 50, from which shaft power may be transmitted in any suitable manner to a machine or part (not shown) to be operated.

By reference to Fig. 1 of the drawings, it will be understood that the elevating blocks 31 may be dispensed with, and that in such event the wheels 32 of the automobile will travel in the backward movement thereof on the platform or base 7 until the axle 33 strikes the elbows or inclined portions 28 of the brackets 27, and that in the further backward movement of the automobile the axle will ride rearwardly on the extensions 29 of said brackets, thus elevating the wheels from the platform and allowing them to contact with the pulleys 20 and to impart motion thereto. When in such position the axle can be secured against forward movement by means of the adjustable and hooked rods 35, as is obvious. In the event it is desired to use the apparatus in conjunction with a motor cycle, it is apparent that the driven wheel thereof can be placed in contact with one of the pulleys 20 and the axle of said wheel supported on the bracket 27, or otherwise if desired.

Having thus fully described my invention what I claim and desire to secure by Letters Patent is—

1. In a power transmitting apparatus, the combination with a supporting frame having a base and upright portion, of a shaft horizontally journaled on said upright part, a pulley on said shaft, means on said shaft for transmitting power therefrom, a pair of rearwardly extended axle supporting elbow brackets mounted on the base, and adjustable means to hold the axle of a vehicle in a given position on said brackets.

2. In a power transmitting apparatus, the combination with a supporting frame having a base and an upright portion, of a shaft horizontally journaled on said upright part, a pulley on said shaft, means on said shaft for transmitting power therefrom, a pair of axle supporting brackets mounted on the base and each having a rearward extension, a block slidably mounted on each of said extensions, and adjustable means to engage the axle of a vehicle and to hold it in a given position on said brackets.

3. In a power transmitting apparatus, the combination with a supporting frame having a base and upright portion, of a shaft horizontally journaled on said upright part, a pulley on said shaft, means on said shaft for transmitting power therefrom, a pair of rearwardly extended axle supporting elbow brackets mounted on the base, an elevating block mounted on the base near each of said brackets and having its upper surface downwardly inclined toward each of its ends, and a hooked rod loosely and adjustably mounted for longitudinal movement on the upright portion of the supporting frame near each side thereof.

4. In a power transmitting apparatus, the combination with a supporting frame having a base and an upright portion, of a shaft horizontally journaled on said upright part, a pulley on said shaft, means on the shaft for transmitting power therefrom, a pair of rearwardly extended axle supporting elbow shaped brackets mounted on the base in front of the upright part of the frame and extended toward said upright part, a block slidably mounted on each of the rearwardly extended portions of said brackets, an elevating block mounted on the base near each of said brackets and having its upper surface downwardly inclined toward each of its ends, the thickest or highest portion of each of said blocks being located substantially in a line drawn from the upright portion of one of said brackets to a similar part of the other bracket, an internally screw threaded and handled sleeve rotatably and adjustably mounted on the upright part of the supporting frame near each end of said part, and a screw threaded rod located in each of said sleeves and each having its front end formed with a hook to engage the axle of a vehicle.

CHARLES D. WRIGHT.

Witnesses:
Chas. C. Tillman,
A. S. Phillips.